(12) United States Patent
Hurley et al.

(10) Patent No.: US 10,217,134 B2
(45) Date of Patent: Feb. 26, 2019

(54) DETOUR BASED CONTENT SELECTIONS

(71) Applicant: Google LLC, Mountain View, CA (US)

(72) Inventors: Fergus Gerard Hurley, San Francisco, CA (US); Michael Schwarz, Berkley, CA (US); Robin Dua, San Francisco, CA (US); Sangsoo Sung, Palo Alto, CA (US); Andrew Tomkins, San Jose, CA (US)

(73) Assignee: Google LLC, Mountain View, CA (US)

( * ) Notice: Subject to any disclaimer, the term of this patent is extended or adjusted under 35 U.S.C. 154(b) by 524 days.

(21) Appl. No.: 14/313,451

(22) Filed: Jun. 24, 2014

(65) Prior Publication Data

US 2015/0371271 A1    Dec. 24, 2015

(51) Int. Cl.
*G06Q 30/00* (2012.01)
*G06Q 30/02* (2012.01)
(Continued)

(52) U.S. Cl.
CPC ..... *G06Q 30/0261* (2013.01); *G06Q 30/0241* (2013.01); *G06Q 30/0259* (2013.01);
(Continued)

(58) Field of Classification Search
CPC ............. G06C 30/02; G06C 30/0241; G06C 30/0244; G06C 30/0251; G06C 30/0255;
(Continued)

(56) References Cited

U.S. PATENT DOCUMENTS 5,802,492 A * 9/1998 DeLorme ........... G01C 21/3476
340/990
6,070,157 A * 5/2000 Jacobson .......... G06F 17/30864
(Continued)

FOREIGN PATENT DOCUMENTS

WO    WO-03074973 A3 * 10/2003  ........ G01C 21/3664
WO    03/074973    9/2013

OTHER PUBLICATIONS

Merriam-Webster's dictionary as of Jan. 19, 2014, definition of "waypoint", available at the Internet Archive, https://www.merriam-webster.com/dictionary/waypoint) (Year: 2014).*
(Continued)

*Primary Examiner* — James A Reagan
(74) *Attorney, Agent, or Firm* — Fish & Richardson P.C.

(57) ABSTRACT

Methods, systems, and apparatus, for detour based content selection. In one aspect, a method includes receiving, at a data processing apparatus, location data for a plurality of users, the location data describing, for each user, locations of a user device of the user; determining, from the location data, route data for the plurality of users, the route data describing, for each user, a route traveled by the user; determining, by the data processing apparatus, for at least one or more of the users, a detour from the route traveled by the user to a retail location of the offeror; determining, by the data processing apparatus, for each of the at least one or more of the users, whether the user is eligible for an offer of the offeror based on the detour; and for each user eligible for an offer, enabling the offeror to provide an offer to the user.

24 Claims, 5 Drawing Sheets

(51) Int. Cl.
    *H04W 4/21*    (2018.01)
    *H04W 4/02*    (2018.01)

(52) U.S. Cl.
    CPC .......... *G06Q 30/0267* (2013.01); *H04W 4/02* (2013.01); *H04W 4/21* (2018.02)

(58) Field of Classification Search
    CPC ............ G06C 30/0259; G06C 30/0261; G06C 30/0264; G06C 30/0267; G06C 30/0269; G06C 30/0271; G06C 30/0273; G06C 30/0275; G06C 30/0277
    USPC ........... 705/14.4, 14.43, 14.49, 14.53, 14.57, 705/14.58, 14.61, 14.64, 14.66, 14.67, 705/14.69, 14.71, 14.73
    See application file for complete search history.

(56) References Cited

U.S. PATENT DOCUMENTS

| | | | | |
|---|---|---|---|---|
| 6,871,144 | B1* | 3/2005 | Lee | G01C 21/20 340/539.32 |
| 7,797,267 | B2* | 9/2010 | Horvitz | G06Q 30/06 706/21 |
| 8,073,460 | B1* | 12/2011 | Scofield | H04W 4/21 455/456.1 |
| 8,473,198 | B2 | 6/2013 | Krumm | |
| 8,639,440 | B2* | 1/2014 | Nicholson | G01C 21/00 701/400 |
| 8,719,094 | B1 | 5/2014 | Klein | |
| 8,868,109 | B1* | 10/2014 | Redfern | G01C 21/206 455/414.1 |
| 8,965,406 | B2* | 2/2015 | Henderson | H04W 4/021 455/414.2 |
| 9,065,908 | B2* | 6/2015 | Buer | H04W 4/02 |
| 9,514,714 | B2* | 12/2016 | Barnett | G01C 21/367 |
| 2002/0102988 | A1 | 8/2002 | Myllymaki | |
| 2005/0209921 | A1* | 9/2005 | Roberts | G06Q 30/02 705/14.13 |
| 2007/0281716 | A1 | 12/2007 | Altman et al. | |
| 2008/0248815 | A1 | 10/2008 | Busch | |
| 2010/0241496 | A1* | 9/2010 | Gupta | G06Q 30/02 705/14.1 |
| 2011/0191184 | A1* | 8/2011 | Blackhurst | G06Q 30/02 705/14.57 |
| 2011/0218849 | A1* | 9/2011 | Rutigliano | G06Q 20/20 705/14.25 |
| 2011/0320275 | A1* | 12/2011 | O'Sullivan | G01C 21/3484 705/14.53 |
| 2012/0036024 | A1* | 2/2012 | Mysen | G06Q 30/02 705/14.71 |
| 2012/0084248 | A1* | 4/2012 | Gavrilescu | G06F 17/30867 706/52 |
| 2012/0130817 | A1* | 5/2012 | Bousaleh | G06Q 30/0261 705/14.58 |
| 2012/0197690 | A1* | 8/2012 | Agulnek | G01C 21/3697 705/14.1 |
| 2013/0030925 | A1 | 1/2013 | Calman | |
| 2013/0036043 | A1* | 2/2013 | Faith | G06Q 30/06 705/39 |
| 2013/0046632 | A1* | 2/2013 | Grigg | G06Q 30/02 705/14.58 |
| 2013/0130709 | A1* | 5/2013 | Voronel | G01C 21/3476 455/456.1 |
| 2013/0179246 | A1 | 7/2013 | Ross | |
| 2013/0346219 | A1* | 12/2013 | Chen | G06Q 30/02 705/14.71 |
| 2014/0085179 | A1* | 3/2014 | Krig | G06F 3/147 345/156 |
| 2014/0149218 | A1* | 5/2014 | Bhogal | G06Q 30/0261 705/14.58 |
| 2014/0156410 | A1 | 6/2014 | Wuersch et al. | |
| 2014/0229101 | A1* | 8/2014 | Glaser | G01C 21/34 701/487 |
| 2014/0297455 | A1* | 10/2014 | Zhao | G06Q 30/0631 705/26.7 |

OTHER PUBLICATIONS

Patterson et al. Nomatic: Location by, for, and of Crowds. (2006) University of California at Irvine. Retrieved online Sep. 21, 2018. https://pdfs.semanticscholar.org/2a2d/2c6233001f66e1cb145e8acaacdbe4da6a21.pdf (Year: 2006).*

Davis et al., "From Context to Content: Leveraging Context to Infer Media Metadata," Multimedia '04 Proceedings of the 12th annual ACM international conference on Multimedia, pp. 188-195, Oct. 2004.

Davis et al., "MMM2: Mobile Media Metadata for Media Sharing," Extended Abstracts of the Conference on Human Factors in Computing Systems (CHI 2005), ACM Press, pp. 1335-1338, Apr. 2005.

Davis et al., "Using Context and Similarity for Face and Location Identification," Proceedings of the IS&T/SPIE 18th Annual Symposium on Electronic Imaging Science and Technology, pp. 60610E-60610E, Jan. 2006.

Liu et al., "Extracting Semantic Location from Outdoor Positioning Systems," Proceedings of the 7th International Conference on Mobile Data Management (MDM'06), 8 pages, May 2006.

Patterson et al., "Nomatic: Location by, for, and of Crowds," Lecture Notes in Computer Science, Location- and Context-Awareness, vol. 3987, pp. 186-203, 2006.

Sarvas et al., "Metadata Creation System for Mobile Images," MobiSys '04 Proceedings of the 2nd international conference on Mobile systems, applications, and services, pp. 36-48, Jun. 2004.

Smith et al., "Social Disclosure of Place: From Location Technology to Communication Practices," Lecture Notes in Computer Science, Pervasive Computing, vol. 3648, pp. 134-151, May 2005.

Smith, "Social-Mobile Applications," Computer, Invisible Computing, pp. 84-85, Apr. 2005.

Wilhelm et al., "Photo annotation on a camera phone," In Extended Abstracts of the 2004 Conference on Human Factors in Computing Systems (CHI 2004), ACM Press, pp. 1403-1406, Apr. 2004.

Yoshino et al., "NAMBA: Location-Aware Collaboration System for Shopping and Meeting," IEEE Transactions on Consumer Electronics, 48(3):470-477, Aug. 2002.

International Search Report and Written Opinion in International Application No. PCT/US2015/035972, dated Sep. 18, 2015, 12 pages.

Iachello et al., "Developing Privacy Guidelines for Social Location Disclosure Applications and Services," Symposium on Usable Privacy and Security (SOUPS), Jul. 2005, pp. 65-76.

International Preliminary Report on Patentability issued in International Application No. PCT/US2015/035972, dated Jan. 5, 2017, 9 pages.

* cited by examiner

DETOUR BASED CONTENT SELECTIONS

BACKGROUND

The Internet enables access to a wide variety of resources, e.g., video and/or audio files, web pages for particular subjects, news articles, etc. Such access to these resources has likewise enabled opportunities for providing additional content, such as advertisements. A variety of content selection schemes are in use, each of which focuses on a particular feature or set of features by which the additional content may be selected. In the case of advertisements, for example, keyword selection, remarketing lists, location based information, and the like are used to provide advertisements that may be of interest to the user.

SUMMARY

This specification describes technologies relating to providing content, such as advertisements/offers, to a user based on a detour a user must take to arrive at a physical location.

In general, one innovative aspect of the subject matter described in this specification can be embodied in methods that include the actions of receiving, at a data processing apparatus, location data for a plurality of users, the location data describing, for each user, locations of a user device of the user; determining, from the location data, route data for the plurality of users, the route data describing, for each user, a route traveled by the user; determining, by the data processing apparatus, for at least one or more of the users, a detour from the route traveled by the user to a retail location of the offeror; determining, by the data processing apparatus, for each of the at least one or more of the users, whether the user is eligible for an offer of the offeror based on the detour; and for each user eligible for an offer, enabling the offeror to provide an offer to the user. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The systems and methods disclosed in this document take into account a distance metric, such as time or physical distance, that affects a user's likelihood to view an offer or otherwise act in response to the offer. Furthermore, based on route data of the user, the systems and methods may limit the provisioning of offers to non-customers of the offeror. Either alone or in combination, these features enable the offeror to effectively devote advertising resources to a particular set of non-customers of a physical location. This, in turn, provides a very high return on investment for each non-customer that is converted to a customer at the physical location.

In the case of non-customers of an offeror, the systems and methods facilitate the introduction of a user to an offeror at a particular location. This may result in the user "discovering" a new retailer at a convenient location that provides goods and services that the user desires. As a result, a new customer relationship may be established with the user, and the user's brand loyalty to the offeror may be strengthened over time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A detour processing system identifies users for an offeror based on offeror locations and location data describing prior locations of users. The location data is also used to generate route data describing routes taken by the users. In some implementations, the users that are identified are non-customers of the offeror. For each non-customer, the system determines a detour from the route traveled by the non-customer to a retail location of the offeror. Based on the detour, the system determines whether the non-customer is eligible for a detour offer of the offeror. For each non-customer eligible for an offer, the system enables the offeror to provide an offer to the non-customer. For example, the system may enable the offeror to submit a bid for an advertisement to be placed for the non-customer's consumption, or the system may enable the generation of a lead for the non-customer, etc.

A similar process may also be used for users that are not determined to be non-customers of the offeror. However, in these implementations, the system still determines a detour from the route traveled by the user to a retail location of the offeror, and based on the detour, the system determines whether the user is eligible for a detour offer of the offeror.

These features and additional features are described in more detail below.

Figure 1:
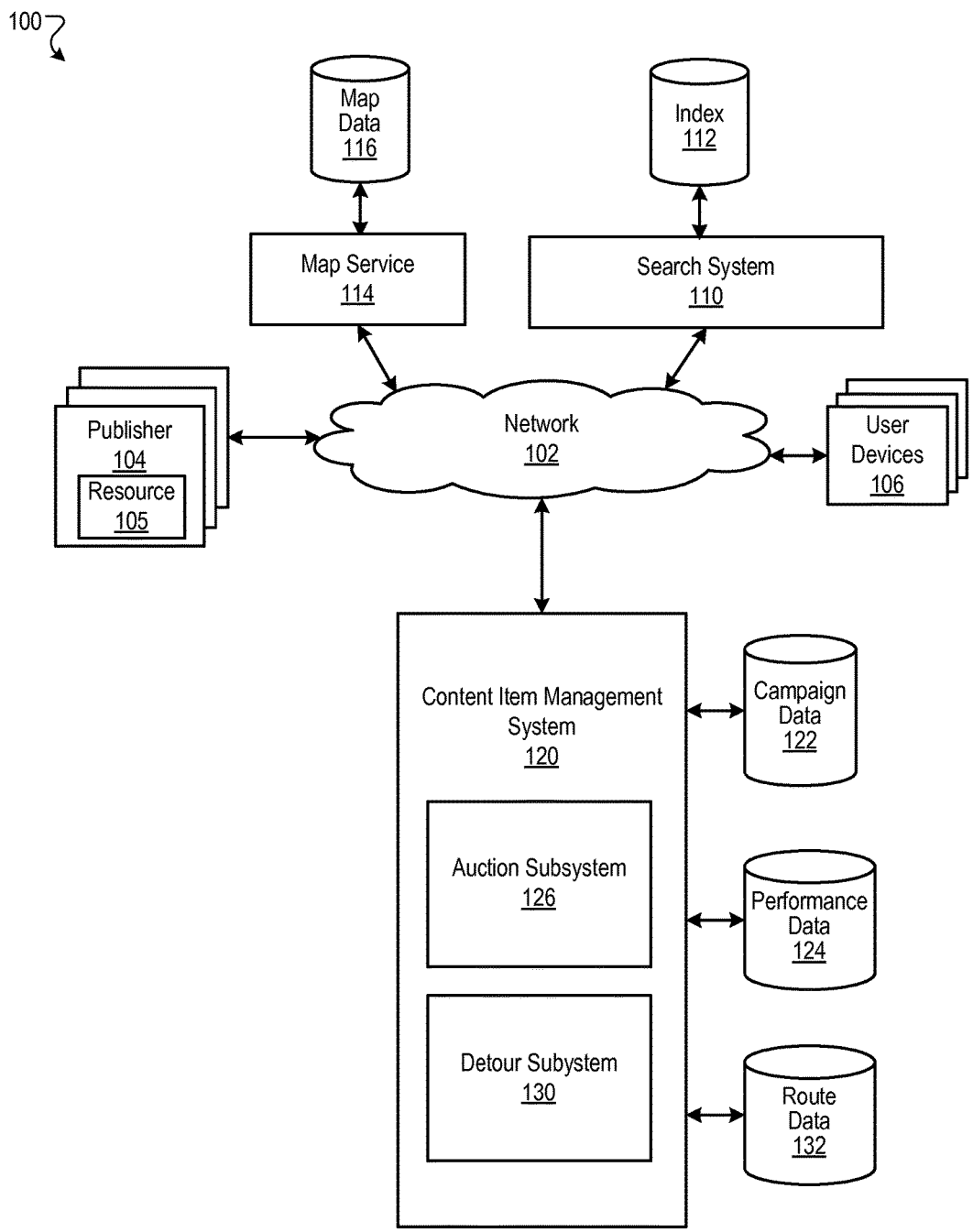
FIG. 1 is a block diagram of an example environment in which content can be provided to users based on detours of the users.

FIG. 1 is a block diagram of an example environment 100 in which content can be provided to users based on detours of the users. A computer network 102, such as the Internet, connects publisher web sites 104, user devices 106, and the search engine 110, and content item management system 120. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, images, videos, and feed sources, to name just a few. The resources can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The user devices 106 submit search queries to the search engine 110. In response, the search engine 110 uses the index 112 to identify resources that are relevant to the queries. The search engine 110 identifies the resources in the form of search results and returns the search results to the user devices 106 in a search results page resource. A search result is data generated by the search engine 110 that identifies a resource that satisfies a particular search query, and includes a resource locator for the resource. An example search result can include a web page title, a snippet of text extracted from the web page, and the URL of the web page.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

The search system 110 may also include a map service 114, or be in communication with a map service. The map service 114 stores map data 116 that describes maps for geographic regions. The map data 116 also includes addresses and location information, such as latitude and longitude coordinates. The map service 114 may also implement path-finding algorithms to determine routes between two or more locations.

The content item management system 120 facilitates the provisioning of additional content with the resources 105. One example content item management system 120 is an advertisement management system that provided advertisement content items. For the remainder of this document, the content item management system is described in the example context of an advertisement manage system 120. However, other types of content item management systems can be used, such as application provider systems, media provider systems, etc.

The advertisement management system 120 allows advertisers to define selection rules that take into account attributes of the particular user to select advertisements for the users. Example selection rules include keyword selection, in which an advertiser provides bids for keywords that are present in either search queries or webpage content.

Another type of selection rule is detour selection, described in more detail in the sections that follow.

These advertisements can be provided for many different resources, such as the resources 105 of the publishers 104, and on a search results page resource. For example, a resource 105 from a publisher 104 includes instructions that cause the user device to request advertisements from the advertisement management system 120. The advertisement management system 120, in turn, provides advertisements to the particular user device. With respect to a search results page, the user device 106 renders the search results page and sends a request to the advertisement management system 120. The advertisement management system 120, in turn, provides advertisements to the particular user device.

The advertisement management system 120 includes a data storage system that stores campaign data 122 and performance data 124. The campaign data 122 stores advertisements, selection information, and budgeting information for advertisers. The performance data 124 stores data indicating the performance of the advertisements that are served. Such performance data can include, for example, click through rates for advertisements, the number of impressions for advertisements, and the number of conversions for advertisements. Other performance data can also be stored.

The campaign data 122 and the performance data 124 are used as input parameters to an advertisement auction subsystem 126. In particular, the advertisement management system 120, in response to each request for advertisements, conducts an auction to select advertisements that are provided in response to the request. The advertisements are ranked according to a score that, in some implementations, is proportional to a value based on an advertisement bid and one or more parameters specified in the performance data 124. The highest ranked advertisements resulting from the auction are selected and provided to the requesting user device.

Some mobile user devices 106, at the option of the user, may provide location data of the user. This location data may be provided to, for example, the advertisement management system 120. The advertisement management system 130 includes a detour subsystem 130 that processes the location data and generates route data 132 that describes routes taken by the user. Location data may be provided by GPS signal data, Wi-Fi signal data, cellular tower triangulation, data from mapping applications or mapping services, or other appropriate location gathering techniques.

Although shown as a subsystem of the advertisement management system 120, the detour subsystem 130 can be a standalone system or a subsystem in another system, such as a subsystem of the map service 114. In these implementations the advertisement management system 120 may communicate with the detour subsystem 130.

As used in this document, a "route" is a path taken by a user. The route may be one taken in a first instance and that the user is currently taking, or one that has been taken multiple times by the user. In the case of the latter and the route may be one for which the user may be expected to take again with at least a threshold likelihood. Such a route is referred to as an "established route." Furthermore, in the case of the latter, the user need not be actively taking the route at a time an offer is provided. For example, a morning and evening commute path, each taken multiple times per week, may each be a route. However, a path taken from a first location to a second location one time is not considered an established route, as the single instance does not establish a likelihood that the user may take the path again. In some implementations, a route may be established when the route meets a route usage threshold. The route usage threshold may be a minimum number of times for a user's entire travel history, or a minimum number of times for a given period, or some other metric that indicates the user is expected to take the route again in the future.

An established route may also have an active time. For example, a user may take a first route to work between 7:00 AM and 8:00 AM each weekday morning, and may take a second route home between 5:00 PM and 6:00 PM each weekday afternoon. These respective time periods for each of the two routes are the respective active times of the routes.

Other route metrics can also be determined, such as an average travel time and volatility. The average travel time is the average time taken to complete the established route. The volatility is a measure of the user's tendency to deviate from the established route or abandon the route. For example, an established route taken when the user commutes home Monday-Thursday afternoon may have a very low volatility measure because the user rarely deviates from the route. However, the same established route taken on Friday afternoon may have a very high volatility measure, as the user may often make detours on Friday afternoon to run errands, such as picking up groceries, or for social engagements, such as going out to dinner.

In some implementations, the advertisement management system 120 allows for offer selection for a user based on the routes taken by the user and a detour from the route required for the offer. In particular, the detour subsystem 130 determines, for an offeror, a physical location of the offeror and detours from routes taken by users to reach the physical location of the offeror. Based on the detour, the detour subsystem 130 determines whether to enable the offeror to provide an offer to the user. In some implementations, the offers are only provided to users that are "non-customers" of the offeror. As used in this document, a "non-customer" is a user that has not visited the physical location of the offeror for which an offer may be provided. However, if a user is not classified as a "non-customer," the classification does not imply the user has, in fact, visited the location of the offeror. For example, assume a user drives or walks within a close proximity of the offeror's retail location, but never visits the offer location. The user may not be classified as a "non-customer," however, because the inference drawn from the close proximity of the user's route and the retail location, but the user not visiting the location, is that the user is not interested in the products or services offered by the offeror. Examples processes to determine whether a user is a non-customer are described in more detail below.

Figure 2:
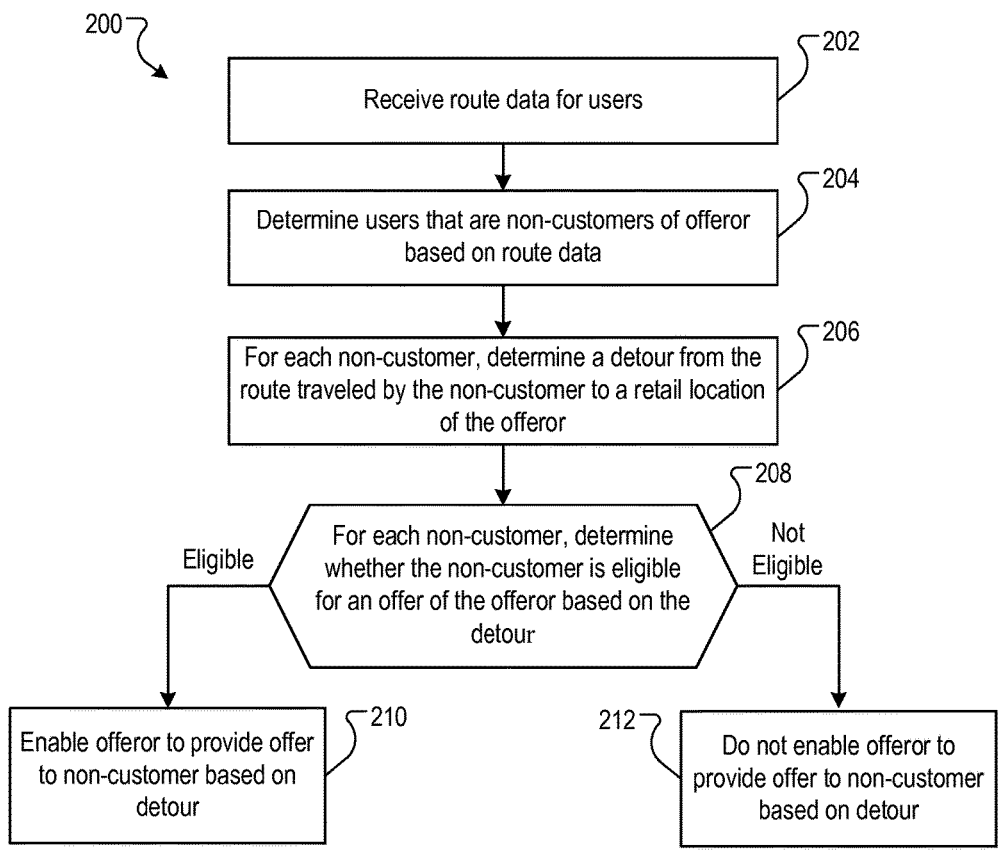
FIG. 2 is a flow diagram of an example process for providing content based on detours.

FIG. 2 is a flow diagram of an example process 200 for providing content based on detours. The process 200 can be implemented in a data processing apparatus that is used to realize the detour subsystem 130.

The detour subsystem 130 receives route data for users (202). For example, as described above, route data 132 for users can be provided by the advertisement management system 120, the map service 114, and the like. The route data describes, for each user, routes traveled by the user. In some implementations, the detour subsystem 130 may be configured to determine the route data based on the location data that describes locations where the user device of the user has been. Additionally, the detour subsystem 130 may also determine, based on the location data and the determined routes, additional route-related information, such as activity times, volatility, etc., as described above.

The detour subsystem 130 determines users that are non-customers of the offeror based on the route data (204). As described above, a user is a non-customer of an offeror if the user's route is not within a threshold distance of an offeror location. A more detailed process for identifying non-customers is described with reference to FIG. 3 below.

The detour subsystem 130, for each non-customer, determines a detour from the route traveled by the non-customer to a retail location of the offeror (206). The offeror may specify to the advertisement management system that offers are available for a retail location of the offeror. The retail location is specified by an address or coordinates of the physical location. The detour subsystem 130 determines, for each non-customer, one or more detours from a route of the non-customer to the retail location. Any appropriate path finding process can be used, and one or more constraints can also be used. For example, the constraint may be to minimize distance, or to minimize time. In implementations for which active time of the routes are available, distance and time measurements may also take into account traffic conditions, construction conditions, and the like for those active route times.

The detour subsystem 130, for each non-customer, determines whether the non-customer is eligible for an offer of the offeror based on the detour (208). Generally, a non-customer is eligible for an offer of the offeror if a distance measure of the detour is less than a threshold distance measure. A more detailed process for determining eligibility is described with reference to FIG. 4 below.

If the detour subsystem 130 determines the non-customer is eligible for an offer of the offeror based on the detour, then the detour subsystem 130 enables the offeror to provide a detour offer to non-customer based on the detour (210). For example, an offeror may submit bids for an offer to be presented to the user on a user device 106. The offer, or advertisement, may be presented to the user in a variety of ways. For example, the offer may be an advertisement that is shown when the user is using a user device to navigate a route for which the detour and offer were determined. Conversely, the offer may be presented at a different time and location, such as on a user's desktop computer. An example offer and presentation is described with reference to FIG. 5 below.

In some implementations, instead of a bid for a particular presentation, the offeror may have a valuation based on converting the non-customer to repeat customer. The valuation may be expressed in terms of a percentage of sales or fixed fee for each visit subsequent to a first visit by the user to the offeror location, where the first visit is in response to acceptance of the offer. For example, grocery store may provide a valuation of $0 for acceptance of the detour offer, and $1.00 for each subsequent visit to the grocery store by the user, up to a maximum number of visits, such as 10 visits. Thus, should the user visit the store 10 addition times after the first visit during which the user redeemed the offer, and within a given period, e.g., three months, the content item management system 120 will receive $10 in total revenue for the placement of the offer. Various customer tracking techniques can be used, such as by the establishment of customer loyalty cards, etc., and customer visits may be reported by the offeror to the content item management system 120 for revenue collection purposes.

Conversely, if the detour subsystem 130 determines the non-customer is not eligible for an offer of the offeror based on the detour, then the detour subsystem does not enable the offeror to provide an offer to non-customer based on the detour (212).

Although the process 200 is described in the context of non-customers, the step of determining whether a user is a non-customer can be omitted. In these implementations, a detour is determined for each user, as in step 206, and for each user, the detour subsystem 130 determines whether the user is eligible for an offer based on the detour, as in step 208.

In some implementations, a user sensitivity to an offer value and distance measure may be determined when considering whether a detour offer is eligible for presentation. The user sensitivity to an offer value and distance measure may, for example, be based on performance of offers to the user or to a group of users that share a common attribute and to which the user belongs. For example, the acceptance rate of various offers, each having a respective value of V given a respective detour distance metric value of D, may be evaluated. Based on the various values V and D, a model that determine an acceptance likelihood P can be generated for the group, e.g., $$P(A)=f(V,D)$$

For users that belong to the group, offers of various values and distances are determined to be eligible if the acceptance likelihood P meets a threshold.

Although not required, the detour subsystems 130 may, in some implementations, select offers for only non-customers of the offeror location. For example, the advertisement management system 120 may use the detour subsystem 130 to attract new customers to an offeror location. In some implementations, the determination of non-customers is location specific, and not retailer/offeror specific. For example, a user may frequent a first location of a retailer, but may not frequent a second location of the same retailer. Thus, while the user is a customer of the retailer, the user is still considered a non-customer of the retailer at the second location. In other implementations, the detour subsystems 130 may select different offers for customers and non-customers, respectively.

In other implementations, the determination of non-customers is not location specific, but is retailer/offeror specific. For example, a user may frequent a first location of a retailer, but may not frequent a second location of the same retailer. The retailer may specify the second location for which detour-related offers may be served. In these implementations, all locations of the retailer are considered, and if the user is determined to not be a non-customer of a particular location, the status of the user will apply to all locations. Furthermore, in variations of these implementations, additional user data, such as customer information of the retailer and transaction data, if available, may be used to determine whether the user is a non-customer. For example, determination of non-customer status may extend to on-line presence of the retailer. A user that has no transaction data specifying transactions between the user and the offeror may be non-customers; however, if a user is determined to be an on-line customer through transaction data, then the user is determined not to be a non-customer for each retailer location.

Figure 3:
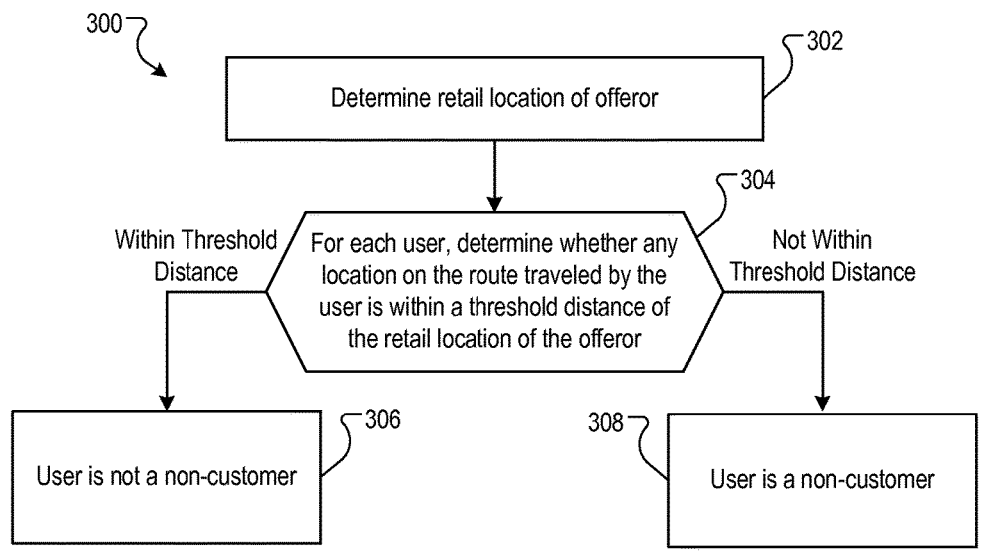
FIG. 3 is a flow diagram of an example process for identifying non-customers based on route data.

FIG. 3 is a flow diagram of an example process for identifying non-customers based on route data. The process 300 can be implemented in a data processing apparatus that is used to realize the detour subsystem 130.

The detour subsystem 130 determines a retail location of the offeror (302). For example, a retailer may specify store locations of the retailer as retail locations of the offeror. Each store location is a location for which a detour offer may be presented.

The detour subsystem 130, for each user, determines whether any location on the route traveled by the user is within a threshold distance of the retail location of the offeror (304). For example, based on historical route data of a user, the detour subsystem 130 determines whether any location on the route traveled by the user is within a threshold distance of the retail location of the offeror. In some implementations, the threshold distance may be in terms of physical distance, or in terms of time.

If the locations along the user's route are not within the threshold distance, the user is determined to be a non-customer. This is based on the inference that if the route data indicates the user has been within the threshold distance, the user is aware of the location and thus is not interested in the offeror's goods or services provided at that location. For example, assume the threshold distance is a city block. If the route data indicates the user drives by the location every day and never stops at the location, the person is likely not interested in the offeror's goods or services provided at that location. Thus, even though the person is in fact a non-customer, the detour subsystem 130 will not determine the person to be a non-customer. Accordingly, if the detour subsystem 130 determines a location on the route traveled by the user is within a threshold distance of the retail location of the offeror, then the detour subsystem 130 determines the user is not a non-customer of the offeror (306).

Conversely, if the detour subsystem 130 determines all locations on the route traveled by the user are not within the threshold distance of the retail location of the offeror, then the detour subsystem 130 determines the user is non-customer of the offeror (308). This is based on the inference that if the route data indicates the user has not been within the threshold distance, the user is unaware of the location and thus may be interested in the offeror's goods or services provided at that location. For example, assume the threshold distance is a city block, as described above. If the route data indicates the user never drives closer than the four city blocks from the location, the person is likely unaware of offeror's goods or services provided at that location and may be open to an offer for that location.

In some implementations, the ability to provide an offer to a user may be subject to other criteria in addition to a user being a non-customer. For example, physical distance of a detour, travel time of a detour, and the time at which the user is expected to take a route may be factors to consider when determining whether to provide a detour offer to a user.

Figure 4:
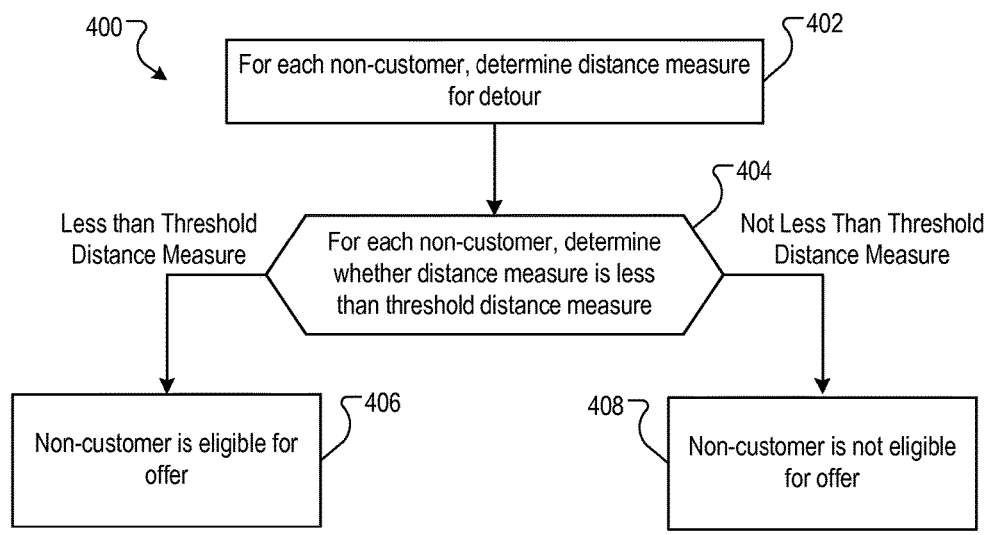
FIG. 4 is a flow diagram of example process for determining whether a non-customer is eligible for an offer.

FIG. 4 is a flow diagram of example process for determining whether a non-customer is eligible for an offer. The process 400 can be implemented in a data processing apparatus that is used to realize the detour subsystem 130.

The detour subsystem 130, for each non-customer, determines a distance measure for detour (402). The distance measure can be based on the physical distance of the detour, and/or the time to take the detour. The detour subsystem 130 can, in some implementations, take into account traffic conditions, road conditions, and other data that that may describe travel-impacting conditions.

The detour subsystem 130, for each non-customer, determines whether the distance measure is less than a threshold distance measure (404). The threshold distance measure can be a threshold that corresponds to the type of distance measure. In some implementations, the threshold distance measure may vary based on location. For example, for rural locations, the physical distance threshold may be longer than for an urban location. Additionally, the threshold distance measure may vary based on the user. For example, over time, a user may exhibit a preference to be responsive to short detour offers. The user's responsiveness may be measured, for example, by clicking on detour offers, or, for example, by redeeming an offer at the locating. In the case of the latter, the retail location reports redemption information back to the advertisement management system 120.

If the detour subsystem 130 determines the distance measure is less than a threshold distance measure, then the detour subsystem 130 determines the non-customer is eligible for an offer (406). For example, the system may enable the offeror to submit a bid for an advertisement to be placed for the non-customer's consumption, or the system may enable the generation of a lead for the non-customer, etc. Conversely, if the detour subsystem 130 determines the distance measure is not less than a threshold distance measure, then the detour subsystem 130 determines the non-customer is not eligible for an offer (408).

In some implementations, presentation time constraints can also be used to determine eligibility. For example, an offeror may desire to show an offer for a location only if a presentation time for the offer is within a predefined time period prior to the active time of the route. To illustrate, assume the predefined time period is one hour. The detour processor 130 accesses the route data for a route and determines from the data that a route is active from 5:30 PM-6:30 PM. Thus, a user may be presented with a detour-based advertisement for that route only within an hour of the user embarking on a route for which a corresponding detour is determined, e.g., from 4:30 PM to 5:30 PM. Prior to this time period, for example, the offer may not be provided.

In some implementations, the volatility of a user with respect to a seasonal route can also be used to determine eligibility. For example, for a particular route, the detour subsystem may determine that the user rarely deviates from the each seasonal route during weekday mornings and during weekday afternoons, except for the seasonal route of Friday afternoon. During Friday afternoon, the user may often deviate from the route (e.g., to run errands, etc.). Each seasonal route instance has a volatility measure that is a measure of the user's tendency to deviate from the route. The detour subsystem 130 compares these measures to a volatility threshold, and the threshold must be met by at least one seasonal instance before user is eligible to receive a detour offer. Assume that only the seasonal route instance on Friday afternoon exceeds the threshold; in this situation, detour offers for the route would be enabled.

In some implementations, the volatility measure can be combined with the presentation time constraints so that only detour offers are provided at certain times before certain route instances. For example, combining the two scenarios above, the user would only be eligible to receive a route offer during the time period of 4:30 PM-5:30 PM on Friday afternoon.

In some implementations, when a user is eligible to receive a detour offer, the offeror may bid for an impression of a detour offer. The bidding may be in the same form as for the placement of other advertisements. However, in some implementations, data for the route and detour can be used to scale the bid and/or auction parameter values for the detour offer. A detour offer's ranking in an auction may be proportional to the inverse of the distance measure of the detour, for example. Likewise, the ranking may be proportional to the volatility of the route. To illustrate, an offer corresponding to a very long detour that is near the limit of a threshold distance may be ranked lower than an offer corresponding to a much shorter detour, when all other factors are equal. Likewise, an offer corresponding to a detour offer for a very volatile route instance may be ranked higher than an offer corresponding detour for a route instance that is much less volatile, when all other factors are equal.

The auction subsystem 124, for example, may be configured to adjust bids based on the distance measures, volatility, etc. of routes. A variety of appropriate adjustment processes can be used. For examples, adjustments can be stepwise or continuous functions that are responsive to detour and route measure inputs.

Figure 5:
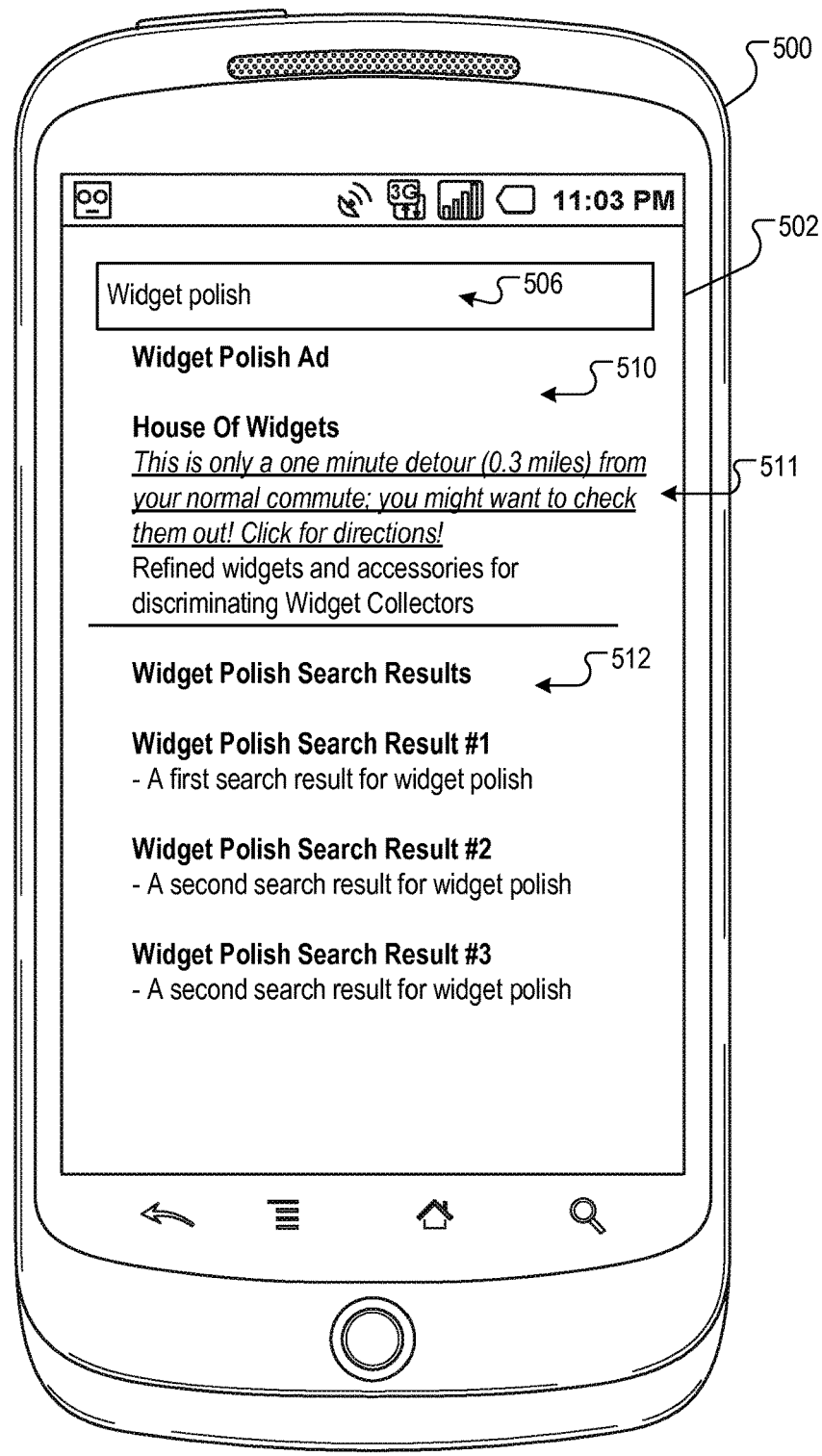
FIG. 5 is an illustration of a user interface at a user device in which an offer based on a detour is presented.

A detour offer may, in some implementations, include data that describes the detour to the user. FIG. 5 is an illustration of a user interface 502 at a user device 500 in which an offer 510 based on a detour is presented. In the user interface 502 search results 512 and the offer 510 are displayed in response to the query 506 [Widget polish]. The detour offer 510 may include a link 511 with anchor text that describes the offer is for a location that is a short detour from a user's commute. Selecting the text 511, for example, may bring up a map with directions relative to the user's normal route. Alternatively, selecting the 511 may set the detour as a series of waypoints in a user's normal commute. This latter implementation is useful, for example, when the detour offer 510 is displayed on a device that provides GPS navigation functions.

The features above are described in the context of non-customers. However, detour offers can also be provided to users that are customers of a particular location, and the steps of determining a non-customer can be omitted.

Likewise, eligibility constraints for a detour offer can be relaxed or even omitted. While the distance constraints tend preclude the presentation of detour offers for very lengthy detours, distance constraints are not required.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 6:
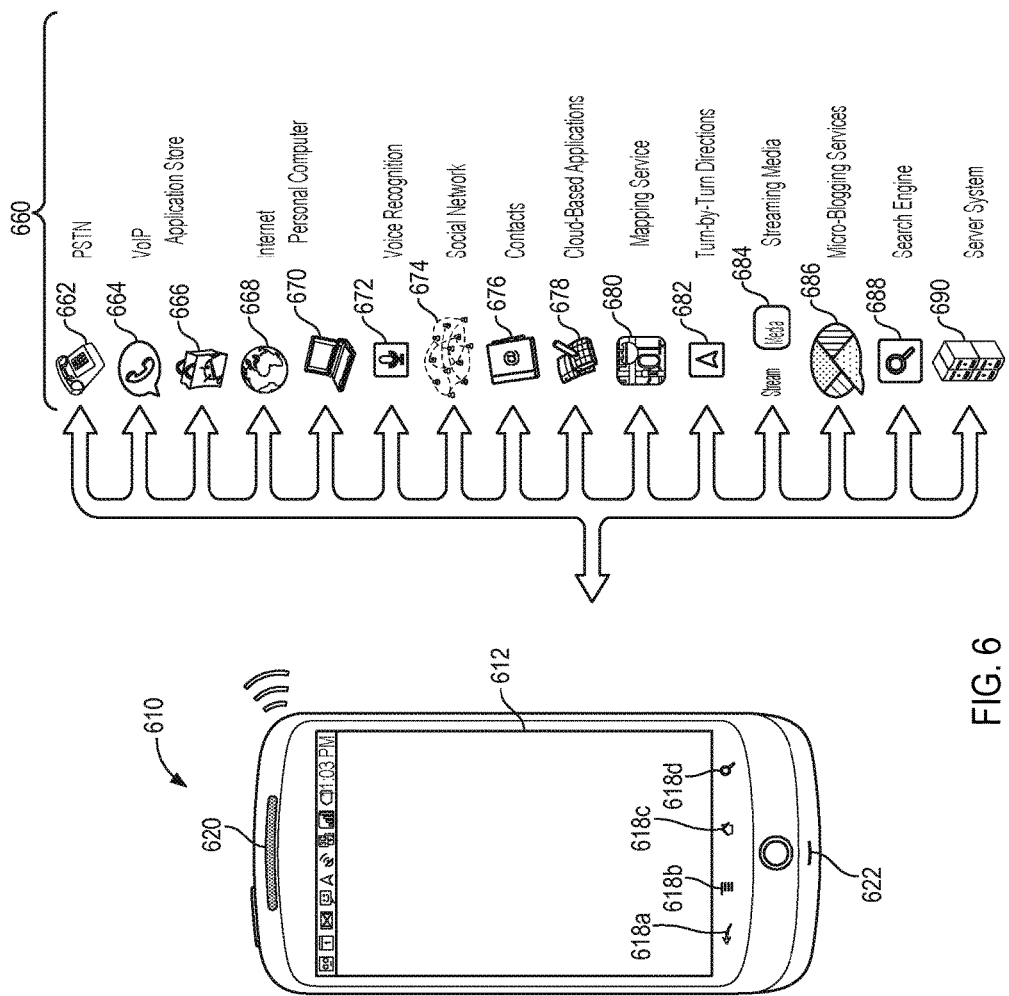
FIG. 6 is a block diagram of an example mobile computing device.

FIG. 6 is a block diagram of example mobile computing device. In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as may various different input components.

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

The mobile computing device 610 may include other applications, computing sub-systems, and hardware. A voice recognition service 672 may receive voice communication data received by the mobile computing device's microphone 622, and translate the voice communication into corresponding textual data or perform voice recognition. The processed voice data can be input to the command models stored in the command models data 122 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 610 to the network 650 to enable communication between the mobile computing device 610 and other computing systems that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing systems associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call using a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program.

Mapping service 680 can provide the mobile computing device 610 with street maps, route planning information, and satellite images. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 890. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
   receiving, by the data processing apparatus and as having been sent by a user device, location data that identifies locations of the user device and that includes at least one of GPS signal data received by the user device, Wi-Fi signal data received by the user device, or cellular tower triangulation signals received by the user device;
   determining, by the data processing apparatus and based on the location data, a travel route for the user device, wherein determining the travel route includes analyzing the at least one of the GPS signal data, the Wi-Fi signal data, or the cellular tower triangulation signals to determine locations of the user device moving along the travel route;
   determining, by the data processing apparatus and based on the location data, a volatility of the travel route for the user device, the volatility of the travel route representing a tendency for the user device to at least one of deviate from the travel route or abandon the travel route;
   determining, by the data processing apparatus, whether the volatility of the travel route meets a volatility threshold;
   in response to determining that the volatility of the travel route meets the volatility threshold:
      determining, by the data processing apparatus, a detour from the travel route for the user device to a particular physical location; and
      providing, by the data processing apparatus and to the user device, instructions for the user device to present a representation of the detour,
   wherein the user device is configured to receive from the data processing apparatus the instructions for the user device to present the representation of the detour and to present the representation of the detour in a user interface that is displayed on an electronic display of the user device.

2. The computer-implemented method of claim 1, further comprising determining that there is no transaction data that specifies a transaction between a user of the user device and the particular physical location;
   wherein the instructions for the user device to present the representation of the detour is provided from the data processing apparatus and to the user device further in response to determining that there is no transaction data that specifies a transaction between the user of the user device and the particular physical location.

3. The computer-implemented method of claim 1, wherein determining that the characteristic of the detour satisfies the presentation criterion comprises determining whether a distance measure for the detour is less than a threshold distance measure.

4. The computer-implemented method of claim 3, wherein the distance measure is a travel time of the detour.

5. The computer-implemented method of claim 1, wherein the particular physical location is a retail location; and the method further comprises:
   submitting a bid to present the detour to the user device; and
   selecting the bid to present the detour to the user device as a winning bid;
   wherein the data processing apparatus provides the instructions for the user device to present the representation of the detour as a result of the bid to present the detour having been selected as the winning bid.

6. The computer-implemented method of claim 5, further comprising adjusting the bid based on a distance measure for the detour.

7. The computer-implemented method of claim 1, further comprising removing personally identifiable information from the location data that identifies locations of the user device so that the location data does not indicate an identity of a user of the user device.

8. The computer-implemented method of claim 1, further comprising:
   receiving, by the data processing apparatus, a search query that was submitted from the user device; and
   identifying, by the data processing apparatus, the particular physical location based on the particular physical location being associated with an entity that is determined to be responsive to the search query;
   wherein the user device is further configured to present the representation of the detour in the user interface along with a set of search results responsive to the search query.

9. The computer-implemented method of claim 1, wherein the user device is further configured to generate a link for presentation in the user interface that, when selected, causes the user device to display a map along with directions to the particular physical location according to the detour.

10. The computer-implemented method of claim 1, wherein the user device is further configured to present the representation of the detour by setting the detour as a series of waypoints in a route that is virtually navigated by GPS navigation functions of the user device.

11. The computer-implemented method of claim 1, wherein:
   the detour from the travel route for the user device to the particular physical location is determined further in response to identifying that locations along the travel route for the user device are beyond a threshold distance to the particular physical location, and
   the data processing apparatus provides the instructions for the user device to present the representation of the detour further in response to determining that a characteristic of the detour satisfies a presentation criterion.

12. The computer-implemented method of claim 11, wherein the threshold distance is a physical distance.

13. The computer-implemented method of claim 11, wherein the threshold distance is a time duration.

14. The computer-implemented method of claim 11, further comprising determining, by the data processing apparatus, an active time for the travel route for the user device, the active time indicating a time of day that the user device travels the travel route,
wherein determining that the characteristic of the detour satisfies the presentation criterion comprises determining whether a current time is within a threshold amount of time from the active time for the travel route.

15. A system, comprising:
a data processing apparatus; and
a computer storage medium encoded with instructions that, when executed by the data processing apparatus, cause the data processing apparatus to perform operations comprising:
receiving, by the data processing apparatus and as having been sent by a user device, location data that identifies locations of the user device and that includes at least one of GPS signal data received by the user device, Wi-Fi signal data received by the user device, or cellular tower triangulation signals received by the user device;
determining, by the data processing apparatus and based on the location data, a travel route for the user device, wherein determining the travel route includes analyzing the at least one of the GPS signal data, the Wi-Fi signal data, or the cellular tower triangulation signals to determine locations of the user device moving along the travel route;
determining, by the data processing apparatus and based on the location data, a volatility of the travel route for the user device, the volatility of the travel route representing a tendency for the user device to at least one of deviate from the travel route or abandon the travel route;
determining, by the data processing apparatus, whether the volatility of the travel route meets a volatility threshold;
in response to determining that the volatility of the travel route meets the volatility threshold:
determining, by the data processing apparatus, a detour from the travel route for the user device to a particular physical location; and
providing, by the data processing apparatus and to the user device, instructions for the user device to present a representation of the detour,
wherein the user device is configured to receive from the data processing apparatus the instructions for the user device to present the representation of the detour and to present the representation of the detour in a user interface that is displayed on an electronic display of the user device.

16. The system of claim 15, wherein the operations comprise determining that there is no transaction data that specifies a transaction between a user of the user device and the particular physical location;
wherein the instructions for the user device to present the representation of the detour is provided from the data processing apparatus and to the user device further in response to determining that there is no transaction data that specifies a transaction between the user of the user device and the particular physical location.

17. The system of claim 15, wherein determining that the characteristic of the detour satisfies the presentation criterion comprises determining whether a distance measure for the detour is less than a threshold distance measure.

18. The system of claim 17, wherein the distance measure is a travel time of the detour.

19. The system of claim 15, wherein the particular physical location is a retail location; and the operations further comprise:
submitting a bid to present the detour to the user device; and
selecting the bid to present the detour to the user device as a winning bid;
wherein the data processing apparatus provides the instructions for the user device to present the representation of the detour as a result of the bid to present the detour having been selected as the winning bid.

20. The system of claim 19, wherein the operations comprise adjusting the bid based on a distance measure for the detour.

21. The system of claim 15, wherein:
the detour from the travel route for the user device to the particular physical location is determined further in response to identifying that locations along the travel route for the user device are beyond a threshold distance to the particular physical location, and
the data processing apparatus provides the instructions for the user device to present the representation of the detour further in response to determining that a characteristic of the detour satisfies a presentation criterion.

22. The system of claim 21, wherein the threshold distance is a physical distance.

23. The system of claim 21, wherein the threshold distance is a time duration.

24. A non-transitory computer storage medium encoded with instructions that, when executed by a data processing apparatus, cause the data processing apparatus to perform operations comprising:
receiving, by the data processing apparatus and as having been sent by a user device, location data that identifies locations of the user device and that includes at least one of GPS signal data received by the user device, Wi-Fi signal data received by the user device, or cellular tower triangulation signals received by the user device;
determining, by the data processing apparatus and based on the location data, a travel route for the user device, wherein determining the travel route includes analyzing the at least one of the GPS signal data, the Wi-Fi signal data, or the cellular tower triangulation signals to determine locations of the user device moving along the travel route;
determining, by the data processing apparatus and based on the location data, a volatility of the travel route for the user device, the volatility of the travel route representing a tendency for the user device to at least one of deviate from the travel route or abandon the travel route;
determining, by the data processing apparatus, whether the volatility of the travel route meets a volatility threshold;
in response to determining that the volatility of the travel route meets the volatility threshold:
determining, by the data processing apparatus, a detour from the travel route for the user device to a particular physical location; and providing, by the data processing apparatus and to the user device, instructions for the user device to present a representation of the detour,
wherein the user device is configured to receive from the data processing apparatus the instructions for the user device to present the representation of the detour and to present the representation of the detour in a user interface that is displayed on an electronic display of the user device.

* * * * *

UNITED STATES PATENT AND TRADEMARK OFFICE
CERTIFICATE OF CORRECTION

PATENT NO. : 10,217,134 B2  
APPLICATION NO. : 14/313451  
DATED : February 26, 2019  
INVENTOR(S) : Hurley et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this
Twenty-fourth Day of September, 2019

Andrei Iancu
*Director of the United States Patent and Trademark Office*